US008725485B2

(12) United States Patent
Tatsuoka et al.

(10) Patent No.: US 8,725,485 B2
(45) Date of Patent: May 13, 2014

(54) SIMULATION METHOD AND SIMULATION APPARATUS (75) Inventors: Masato Tatsuoka, Kawasaki (JP); Atsushi Ike, Kawasaki (JP)

(73) Assignee: Spansion LLC, Sunnyvale, CA (US)

( * ) Notice: Subject to any disclaimer, the term of this patent is extended or adjusted under 35 U.S.C. 154(b) by 758 days.

(21) Appl. No.: 12/037,297

(22) Filed: Feb. 26, 2008

(65) Prior Publication Data

US 2008/0208555 A1    Aug. 28, 2008

(30) Foreign Application Priority Data

Feb. 26, 2007    (JP) .................................. 2007-45577

(51) Int. Cl.
*G06F 17/50*    (2006.01)
(52) U.S. Cl.
USPC ............................... 703/15; 714/34; 717/129
(58) Field of Classification Search
USPC .................. 703/14, 15, 21; 714/6, 13, 15, 16; 707/679, 680, 682
See application file for complete search history.

(56) References Cited

U.S. PATENT DOCUMENTS

| 5,301,309 | A | * | 4/1994 | Sugano | 714/12 |
|---|---|---|---|---|---|
| 5,418,955 | A | * | 5/1995 | Ikeda et al. | 713/1 |
| 5,442,772 | A | * | 8/1995 | Childs et al. | 703/13 |
| 5,455,929 | A | * | 10/1995 | Bosshart et al. | 703/15 |
| 5,630,047 | A | * | 5/1997 | Wang | 714/15 |
| 5,675,759 | A | * | 10/1997 | Shebanow et al. | 712/217 |
| 5,815,727 | A | * | 9/1998 | Motomura | 712/1 |
| 5,872,990 | A | * | 2/1999 | Luick et al. | 712/24 |
| 5,922,078 | A | * | 7/1999 | Hirayama et al. | 714/16 |
| 5,923,832 | A | * | 7/1999 | Shirakihara et al. | 714/37 |
| 5,926,638 | A | | 7/1999 | Inoue | |
| 5,958,070 | A | * | 9/1999 | Stiffler | 714/13 |
| 5,996,088 | A | * | 11/1999 | Frank et al. | 714/6 |
| 6,026,499 | A | * | 2/2000 | Shirakihara et al. | 714/11 |
| 6,044,475 | A | * | 3/2000 | Chung et al. | 714/15 |
| 6,148,416 | A | * | 11/2000 | Masubuchi | 714/15 |
| 6,332,199 | B1 | * | 12/2001 | Meth et al. | 714/13 |
| 6,338,147 | B1 | * | 1/2002 | Meth et al. | 714/13 |
| 6,401,216 | B1 | * | 6/2002 | Meth et al. | 714/16 |
| 6,594,779 | B1 | * | 7/2003 | Chandra et al. | 714/15 |
| 6,691,245 | B1 | * | 2/2004 | DeKoning | 714/6 |
| 6,802,025 | B1 | * | 10/2004 | Thomas et al. | 714/15 |
| 6,983,234 | B1 | * | 1/2006 | Hangal et al. | 703/14 |

(Continued)

FOREIGN PATENT DOCUMENTS

| JP | 4-332053 | 11/1992 |
|---|---|---|
| JP | 5-27661 | 2/1993 |

(Continued)

OTHER PUBLICATIONS

EMC Retrospect Express HD for Windows User's Guide, pp. 1-42, 2006.*

(Continued)

*Primary Examiner* — Omar Fernandez Rivas
*Assistant Examiner* — Kibrom Gebresilassie
(74) *Attorney, Agent, or Firm* — Sterne, Kessler, Goldstein & Fox P.L.L.C.

(57) ABSTRACT

A simulation method and apparatus including a restore point setting unit setting restore points in core models for executing threads using parallel processing. The method also includes storing information for reproducing a state the core models at the restore points.

13 Claims, 9 Drawing Sheets

(56) References Cited

U.S. PATENT DOCUMENTS

| | | | | |
|---|---|---|---|---|
| 7,020,599 | B1* | 3/2006 | Cao et al. | 703/22 |
| 7,206,964 | B2* | 4/2007 | Moser et al. | 714/13 |
| 7,478,278 | B2* | 1/2009 | Archer et al. | 714/15 |
| 7,536,591 | B2* | 5/2009 | Varadarajan et al. | 714/15 |
| 7,634,687 | B2* | 12/2009 | Haselden et al. | 714/15 |
| 7,657,787 | B2* | 2/2010 | Turner et al. | 714/15 |
| 7,689,863 | B1* | 3/2010 | Korenevsky et al. | 714/15 |
| 7,756,831 | B1* | 7/2010 | Rao | 707/638 |
| 7,873,507 | B2 | 1/2011 | Tatsuoka et al. | |
| 2002/0010732 | A1* | 1/2002 | Matsui et al. | 709/107 |
| 2003/0078933 | A1* | 4/2003 | Gara et al. | 707/100 |
| 2004/0078659 | A1* | 4/2004 | Hickson et al. | 714/17 |
| 2005/0034014 | A1* | 2/2005 | Moser et al. | 714/17 |
| 2005/0125629 | A1* | 6/2005 | Kissell | 712/1 |
| 2006/0041786 | A1* | 2/2006 | Janakiraman et al. | 714/13 |
| 2006/0101419 | A1* | 5/2006 | Babcock | 717/130 |
| 2007/0130356 | A1* | 6/2007 | Boucher et al. | 709/230 |

FOREIGN PATENT DOCUMENTS

| | | |
|---|---|---|
| JP | 8-185341 | 7/1996 |
| JP | 09-198276 | 7/1997 |
| JP | 10-161906 | 6/1998 |
| JP | 2000-20349 | 1/2000 |
| JP | 2005-353020 A | 12/2005 |
| JP | 2006-293759 A | 10/2006 |

OTHER PUBLICATIONS

EMC Retrospect Express HD for Windows User's Guide, 2006, pp. 1-42.*

M. Tatsucka et al, "Development of High Speed Simulator for Embedded Multi-Processor", DA symposium 2005, vol. 2005, No. 9, pp. 163-168, Aug. 24, 2005.*

M. Tatsuoka et al, "Development of High Speed Simulator for Embedded Multi-Processor", pp. 163-168, Aug. 24, 2005 (translation pp. 1-11 provided on Nov. 3, 2011).*

Masato Tatsuoka et al., "Development of High-Speed Simulator for Embedded Multi-Processor", DA Symposium 2005, Information Processing Conference Symposium Series, vol. 2005, No. 9, pp. 163-168, Information Processing Society for Japan, Aug. 24, 2005.

Japanese Office Action issued Sep. 13, 2011 in corresponding Japanese Patent Application 2007-045577.

Japanese Office Action mailed Mar. 27, 2012 issued in corresponding Japanese Patent Application No. 2007-045577.

Masato Tatsuoka et al., "Development of High Speed Simulator for Embedded Multi-processor", Information Processing Society of Japan, DA Symposium, Aug. 2005, vol. 2005, No. 9, pp. 163-168.

Japanese Office Action mailed Dec. 18, 2012 issued in corresponding Japanese Patent Application No. 2007-045577.

Wind River, "Wind River Simics for Multi-core Systems Development," 2012, 7 pages.

English-language Abstract of Japanese Patent Application Publication No. 2005-353020 A; 2 pages.

* cited by examiner

SIMULATION METHOD AND SIMULATION APPARATUS

CROSS-REFERENCE TO RELATED APPLICATIONS

This application is based upon and claims the benefit of priority from prior Japanese Patent Application No. 2007-045577 filed on Feb. 26, 2007, the entire contents of which are incorporated herein by reference.

BACKGROUND

1. Field

The embodiments relate to a simulation method and a simulation apparatus applied to a multicore processor, a multiprocessor or a multi-master/slave device.

2. Description of the Related Art

Conventionally, simulators have been used in SoC (System on a Chip) software development, for example. Simulation can involve rerunning a simulator to reproduce states of the processor. However, to develop large-scale software projects on a simulator, development periods become very long due to lengthened rerunning times.

To deal with this problem, for example conventionally a restore point is set at a given time point, and information required to reproduce the state of the processor at the given time point (information relating to memory, registers, buffers, information from inside other processors, data and status information from surrounding circuits, etc.) is stored, and subsequently read and used to reproduce processor operations.

The technologies for storing information at the restore point are becoming more important in the development of software for use in processors such as multiprocessors and multicore processors including a plurality of CPU (Central Processing Unit) cores, which have appeared on the market in recent years.

Figure 1:
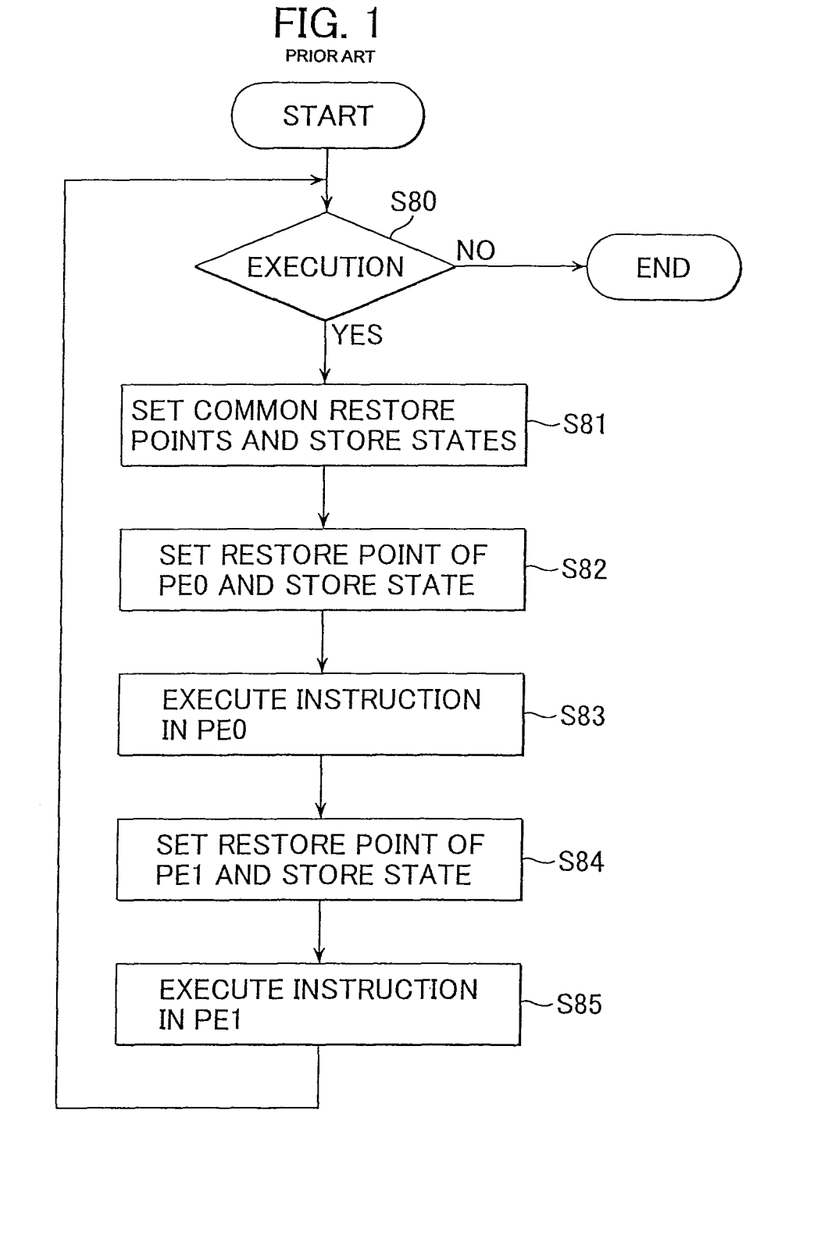
FIG. 1 illustrates a flow of processing when a conventional simulation method using restore points is applied to a multiprocessor operating on a single thread.

FIG. 1 illustrates a flow of processing for a case in which a conventional simulation method using a restore point is applied to a multicore processor which is operating using a single thread.

The following describes an example simulation in a multicore model having core models PE0 and PE1 corresponding to two processor cores.

The simulation can make use of an Instruction Set Simulator (ISS) (not shown).

When the simulation begins, the simulator performs an execution judgment (operation S80). In the case of execution, the simulator can set restore points (common restore points) in surrounding devices, for example shared by the core models PE0 and PE1, and can store corresponding states (information relating to memory usage by the surrounding devices, for example) (operation S81).

Then, after setting restore points in the core model PE0 and storing a state of the core PE0 model (operation S82), the simulator executes a core model PE0 instruction (operation S83).

In the ISS, the instruction execution can be performed with a function such as an exe_loop.

Figure 2:
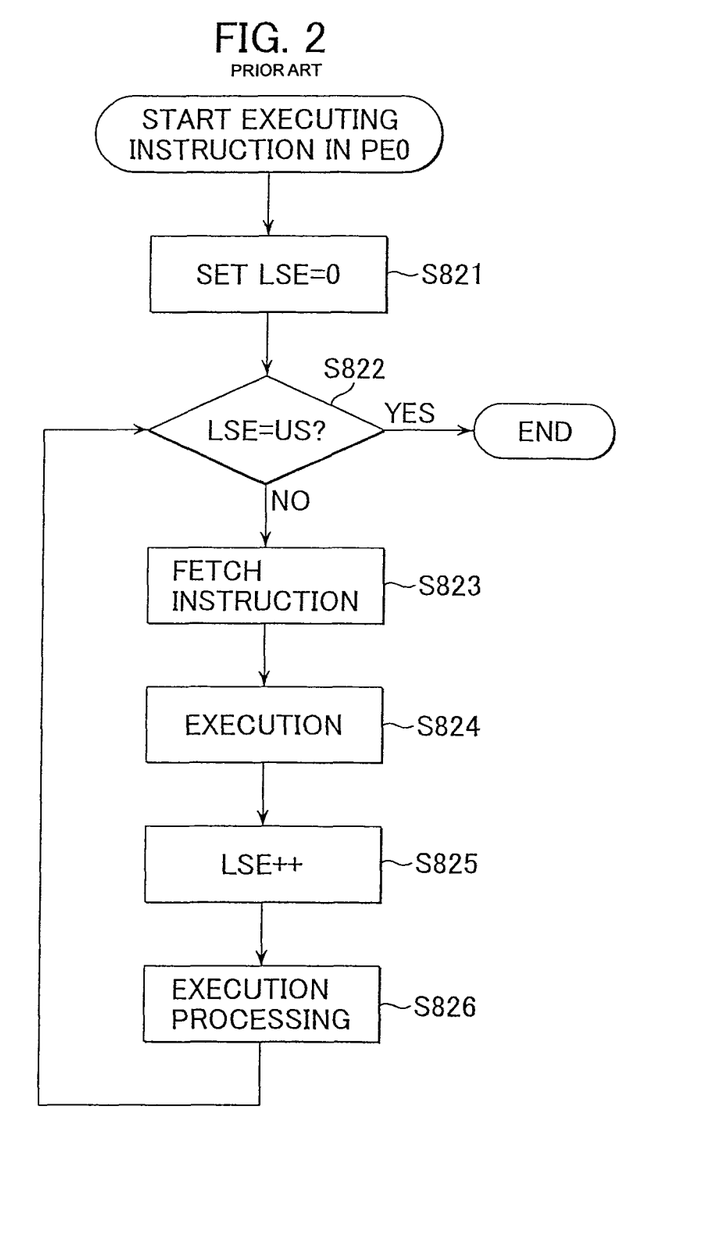
FIG. 2 is a flowchart illustrating processing of an exe_loop function.

FIG. 2 is a flowchart illustrating processing of the exe_loop function.

The flowchart illustrates an example in which a number of execution instructions (execution operations) in the exe_loop function are specified, and the instructions are executed one at a time.

Note, however, that since the number of instructions in the exe_loop can depend on the architecture, the simulator may execute a plurality of instructions simultaneously rather than executing a single instruction at a time. Here, in the interest of simplicity, the description is limited to a single instruction in a single loop.

First, the simulator can set a local execution (LSE) operation to "0" (operation S821). Next, the simulator judges whether the LSE equals the number of operations set by a user (US) (operation S822). When the two are equal, the simulator ends instruction execution in the core model PE0. When the two are unequal, the simulator fetches an instruction (operation S823), and decodes and executes the fetched instruction (operation S824). Thereafter, the simulator increments the LSE (operation S825), performs exception processing (operation S826), and repeats the processing beginning at operation S822.

As seen in FIG. 1, on completion of instruction execution in the core model PE0, the simulator can set a restore point in the core model PE1 and can store a state of the core model PE1 (operation S84), and performs instruction execution for the core model PE1 in a manner similar to that shown in FIG. 2 (operation S85). Thereafter, the simulator returns to operation S80 and repeats the above-described processing.

Figure 3:
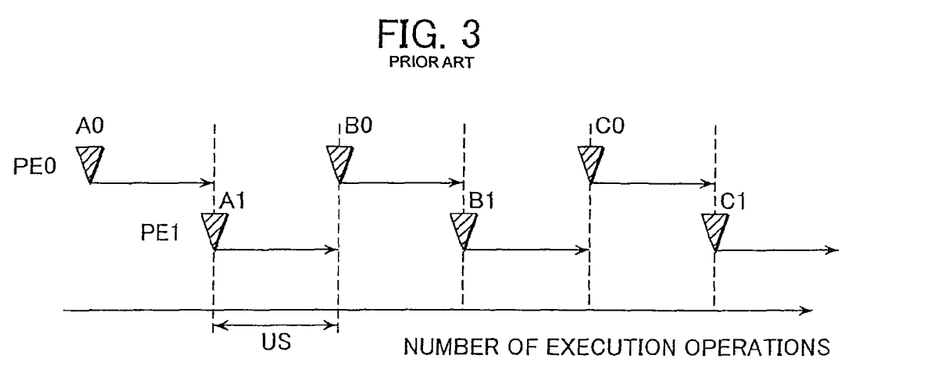
FIG. 3 illustrates an example of single thread operations of multicore processor.

FIG. 3 is a diagram illustrating an example of a single thread operation in the multicore processor.

In the case of a single thread, the core models PE0 and PE1 take turns to perform a single processing unit (US of FIG. 2) of instruction execution. Before performing the respective processing in the core models PE0 and PE1, the simulator can set restore points A0, B0, C0, A1, B1, C1, and store states of the PE0 and PE1 cores at each of the restore points.

However, there is a problem in that the conventional simulation methods are largely intended to be applied to single core devices, and are not appropriate for multicore processors, multiprocessors or multi-master/slave devices. For example, the methods for storing states at restore points corresponding to the single threads shown in FIGS. 1 through 3 have problems of being efficiently finding deadlocks, I/O races, multiple access to shared variables, for example, which can occur when a plurality of core models perform processing in parallel.

According to an aspect of an embodiment discussed herein a simulation method includes setting restore points in each of a plurality of core models for executing threads using parallel processing; and the storing information for reproducing a state of each of the plurality of core models at the restore points.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE PREFERRED EMBODIMENTS

The following describes embodiments in detail with reference to the drawings. Reference will now be made in detail to the embodiments, examples of which are illustrated in the accompanying drawings, wherein like reference numerals refer to the like elements throughout. The embodiments are described below to explain an example invention by referring to the figures FIG. 4 is a diagram illustrating a simulation method of an example embodiment.

The simulation method of an example embodiment can use a simulator to verify multicore processor-use software that performs parallel processing before actual installation.

Core models PE0 and PE1 are simulation models corresponding to CPU cores in the multicore processor that can run the software. The following describes a case in which the two core models PE0 and PE1 are used, but the embodiment is not limited to this number of core models.

Figure 4:
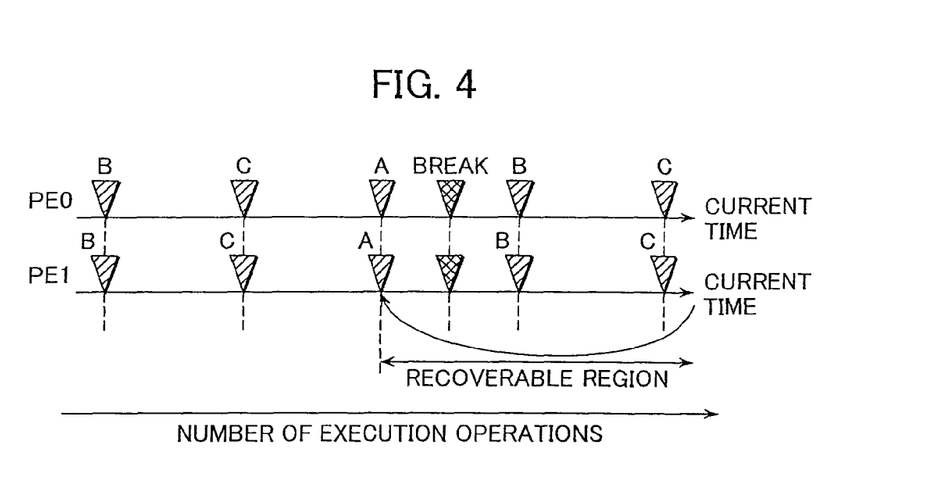
FIG. 4 is a diagram illustrating a simulation method according to an example embodiment.

During the simulation, an ISS can be used to cause the core models PE0 and PE1 to execute parallel processing on each of the threads, as shown in FIG. 4. The horizontal axis in FIG. 4 corresponds to a number of execution operations.

The simulator simultaneously can set restore points for the core models PE0 and PE1 with an interval corresponding to a predetermined number of execution operations (or simulator cycles). In the example of FIG. 4 the simulator can set restore points A, B, and C in the stated order. The simulator also can store, e.g., in a storage unit information necessary for reproducing states of the core models PE0 and PE1 at the restore points A, B, and C (hereinafter this processing may simply be referred to as "storing states of the core model").

The information stored can be memory data, register data, and other internal data of the core models PE0 and PE1 from before execution by the core models PE0 and PE1. The memory data targeted for storage may include all regions of the program data regions, and all regions being accessed by the core models PE0 and PE1 at the instant of storage. Note the internal information data of the core models PE0 and PE1 is data such as register data, data cache data, instruction cache data and buffer data from within the core models PE0 and PE1.

Different storage regions can be used for each of the restore points A, B, and C. On completion of storage of the states at the restore point C, the simulator can proceed to reset the restore point A and overwrite the states of the previous restore point A. Hence, if a current time point is the time point at which the states at restore point C, the rightmost point, can be stored as shown in FIG. 4, the region to which it is presently currently possible to return only extends as far as the restore point A. However, limiting the storage regions in this way can allow a reduction in the amount of stored information, thereby enabling the amount of consumed computer memory to be reduced. The number of periodic restore points is not limited to three.

According to an embodiment the restore points need not be provided periodically in the manner described above. When a break instruction has been set as shown in FIG. 4 during instruction execution in a given core model (PE0, for example), the simulator may simultaneously set a restore point corresponding to the break instruction in other core models (PE1, for example), and store states at those points.

Alternatively, restore points may be set at positions freely-selected by a user.

Simultaneously setting restore points in a plurality of core models and storing states at each point in the manner described makes it possible to find multiple accesses to common I/O variables, deadlocks, for example when debugging during development of software for performing parallel processing, and is useful for analysis and optimization of the timing performance of parallel programs.

The following describes the simulation method of an example embodiment in detail.

Figure 5:
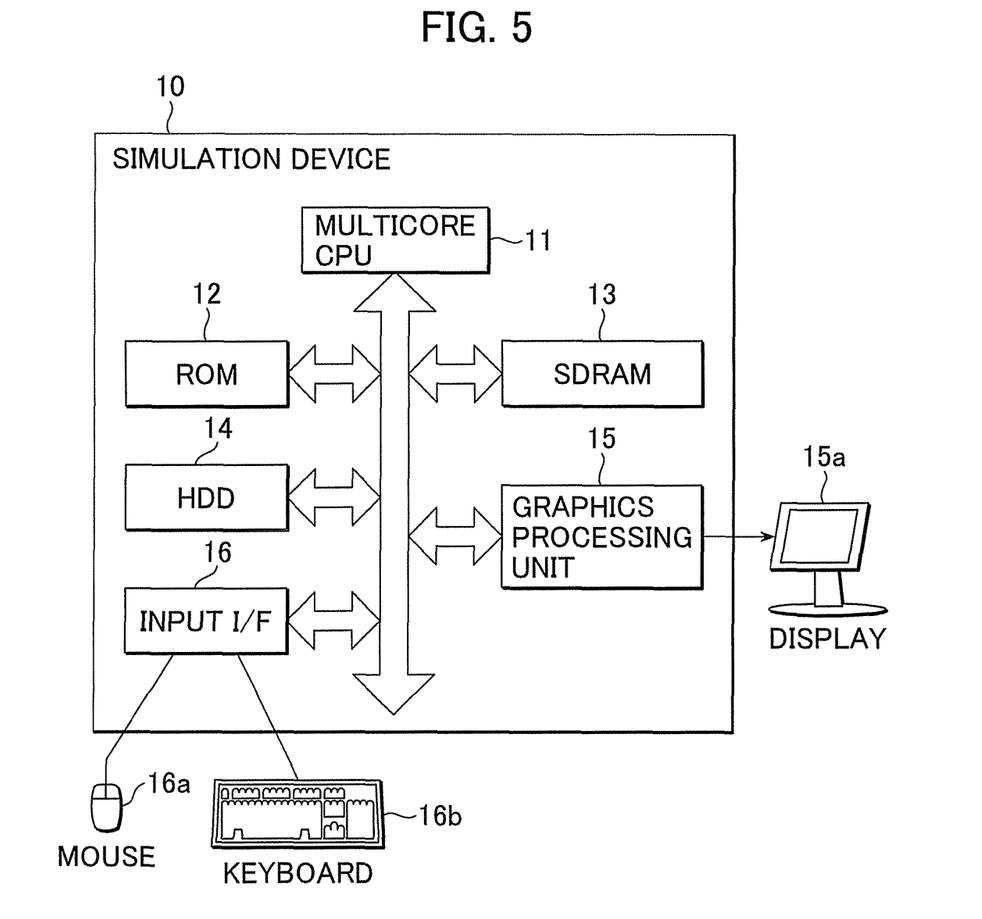
FIG. 5 is a block diagram illustrating an example hardware construction of a simulation apparatus for implementing simulation according to an embodiment.

FIG. 5 illustrates an example simulation apparatus for implementing the example simulation according to an embodiment.

A simulation apparatus 10 can be, for example a computer including a multicore CPU 11, ROM (Read Only Memory) 12, SDRAM (Synchronous Dynamic Random Access Memory) 13, an HDD (Hard Disk Drive) 14, a graphics processing unit 15, an input I/F (Interface) 16, for example interconnected via a bus 17.

Here, the multicore CPU 11 can control the various units in accordance with programs stored in the ROM 12, the HDD 14 or elsewhere and various types of data, and implements the simulation functions of an example embodiment, such as the processing to simultaneously set the restore points in the plurality of core models and processing to select storage regions (storage devices) to store the states.

The ROM 12 can store basic programs to be executed by the multicore CPU 11, and data, for example.

The SDRAM 13 can store programs which are partially executed by the multicore CPU 11 and data from partially executed calculations. The SDRAM also can store states of each core model at the restore points.

The HDD 14 can store an OS (Operating System) for execution by the multicore CPU 11, various application programs, and various types of data.

The graphics processing unit 15 can be, for example, coupled to a display 15a, and causes the display 15a to show various information to the user during the simulation in accordance with display instructions from the multicore CPU 11.

Input devices such as a mouse 16a and a keyboard 16b can be coupled to an input I/F 16, and the input I/F 16 receives information input by the user and transmits the inputted information to the multicore CPU 11 via the bus 17.

The above-described simulation apparatus 10 can be used to realize the multicore simulator as software.

Figure 6:
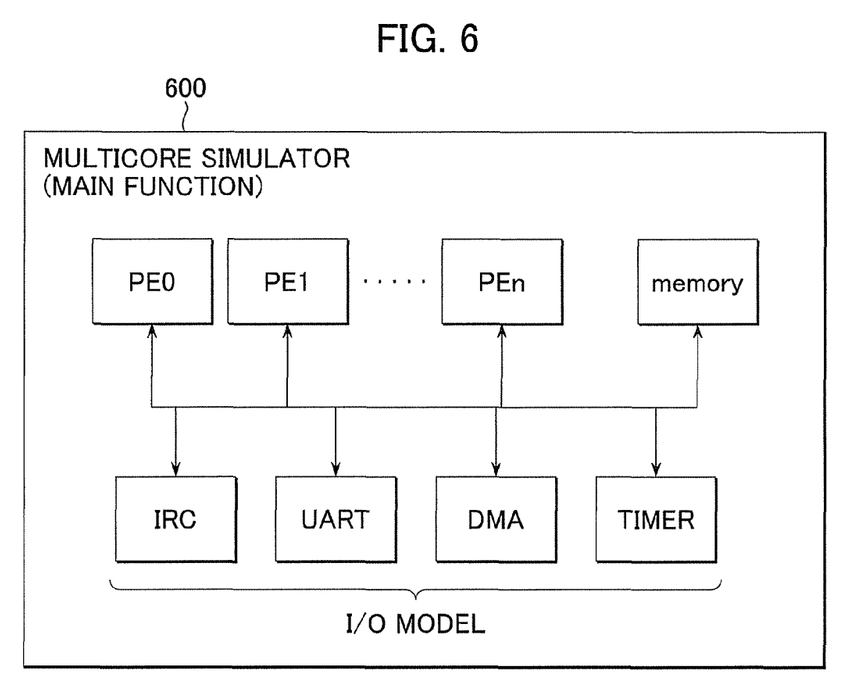
FIG. 6 is a block diagram illustrating a multicore simulator according to an embodiment.

FIG. 6 is a block diagram illustrating an example multicore simulator according to an embodiment.

The multicore simulator 600 can include a "main" function using core models PE0, PE1, . . . , PEn, memory, an IRC (interRupt Controller) which is an I/O model, a UART (Universal Asynchronous Receiver Transmitter), DMA (Direct Memory Access), and a timer, for example.

The multicore simulator can include the multicore CPU 11 of FIG. 5 including n or more CPU cores.

An example simulation method can use a multicore simulator such the example simulation apparatus 10.

Figure 7:
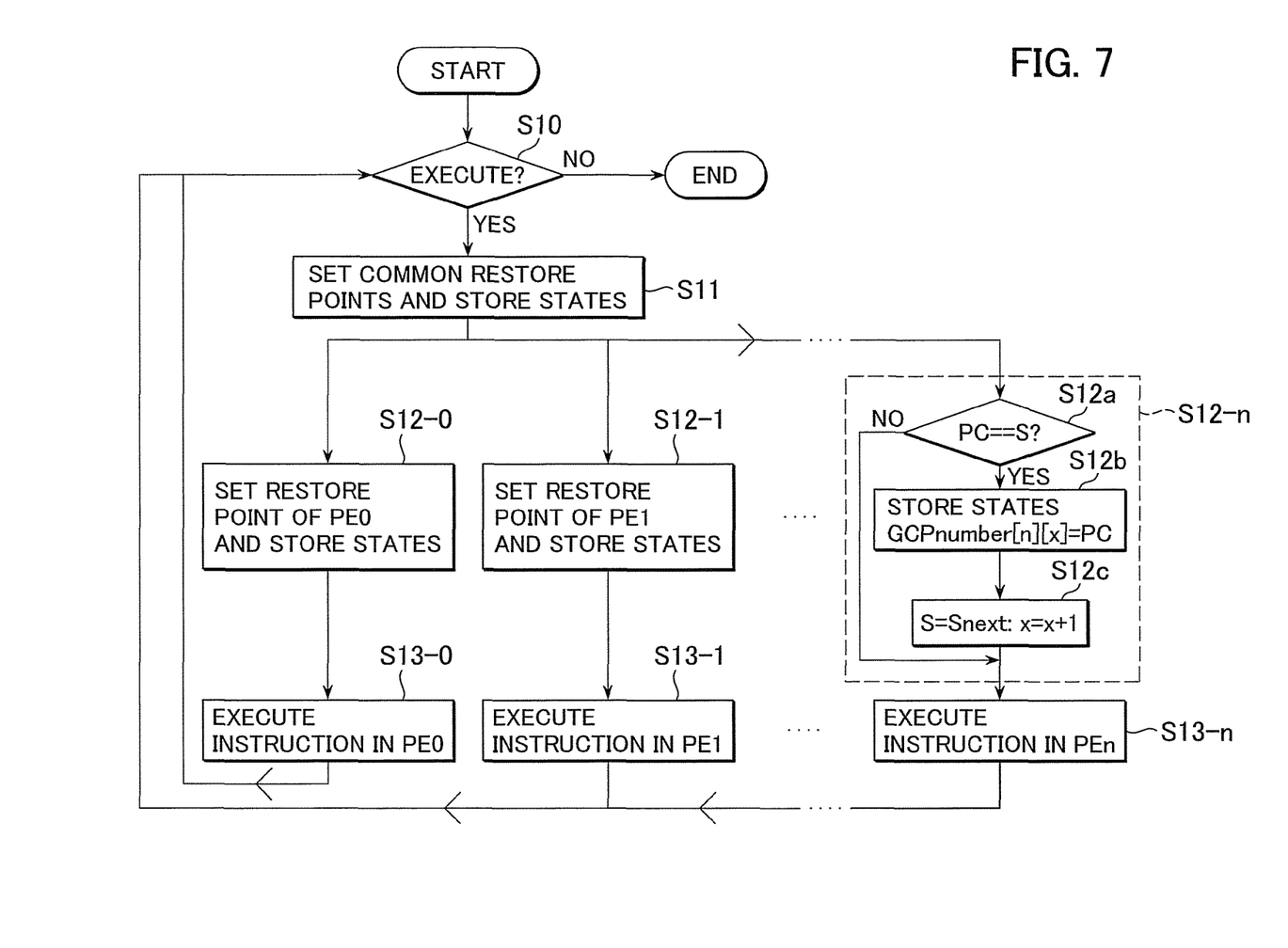
FIG. 7 is a flowchart illustrating an example processing for setting periodic restore points according to an embodiment.

FIG. 7 is a flowchart illustrating example processing for setting the periodic restore points according to an embodiment.

The multicore CPU 11 performs execution judgment (operation S10). In the case that execution is to take place, the simulator can set restore points (common restore points) in the I/O model for example which are common to all the core models PE0 through PEn, and can store the corresponding states in the SDRAM 13 or in the cache memory (not shown in the drawings) of the multicore CPU 11 (operation S11).

Next, the simulator can perform processing to set restore points in each of the core models PE0 through PEn (operation S12-0, S12-1, ..., S12-n) and store the corresponding states. The processing described in detail below can be the processing of operation S12-n (which is substantially the same as the processing of operation S12-0, operation S12-1, for example).

First, the simulator can judge whether a program counter value PC is the same as a periodic restore point value S (operation S12a), and when judging the two values to be the same, can store the states of the core models PE0 through PEn in the SDRAM 13 or in the cache memory of the multicore CPU 11. The simulator then inputs the program counter value to a restore point serial number GCPnumber (n)(x) (operation S12b).

Note that "(n)(x)" indicates the xth restore point of the core model PEn. The stored information is managed by corresponding each piece with a different one of the above-described restore point serial numbers (corresponding to a restore point program counter value PC) which include a core number (1 through n).

The simulator then inputs a next restore point value Snext as the periodic restore point S and increments by one the variable x of the serial number GCPnumber (n)(x) (operation S12c). Snext is, for example, supplied using an array in which predetermined values (for example 100, 200, 300, ...) of each execution operation have been set.

When judging in operation S12a that the program counter value PC is not the same as the restor point value S, or after completion of operation S12c, the simulator performs instruction execution in each of the core models PE0 through PEn (operations S13-0 through S13-n).

On completion of operations S13-0 through S13-n, the simulator returns to the processing of operation S10 and repeats the above-described processing.

According to this processing, it is possible to simultaneously set periodic restore points in the core models PE0 through PEn, and store the states at each of the restore points. At restoration, the simulator is able to specify the restore point at which restoration is desired and reproduce the states of the core models PE0 through PEn by specifying the serial numbers GCPnumber (n)(x) and reading corresponding states from the SDRAM 13 for example.

The following describes example processing for setting restoration points corresponding to breaks when the breaks are set part-way through the instruction execution in the core models PE0 through PEn.

Figure 8:
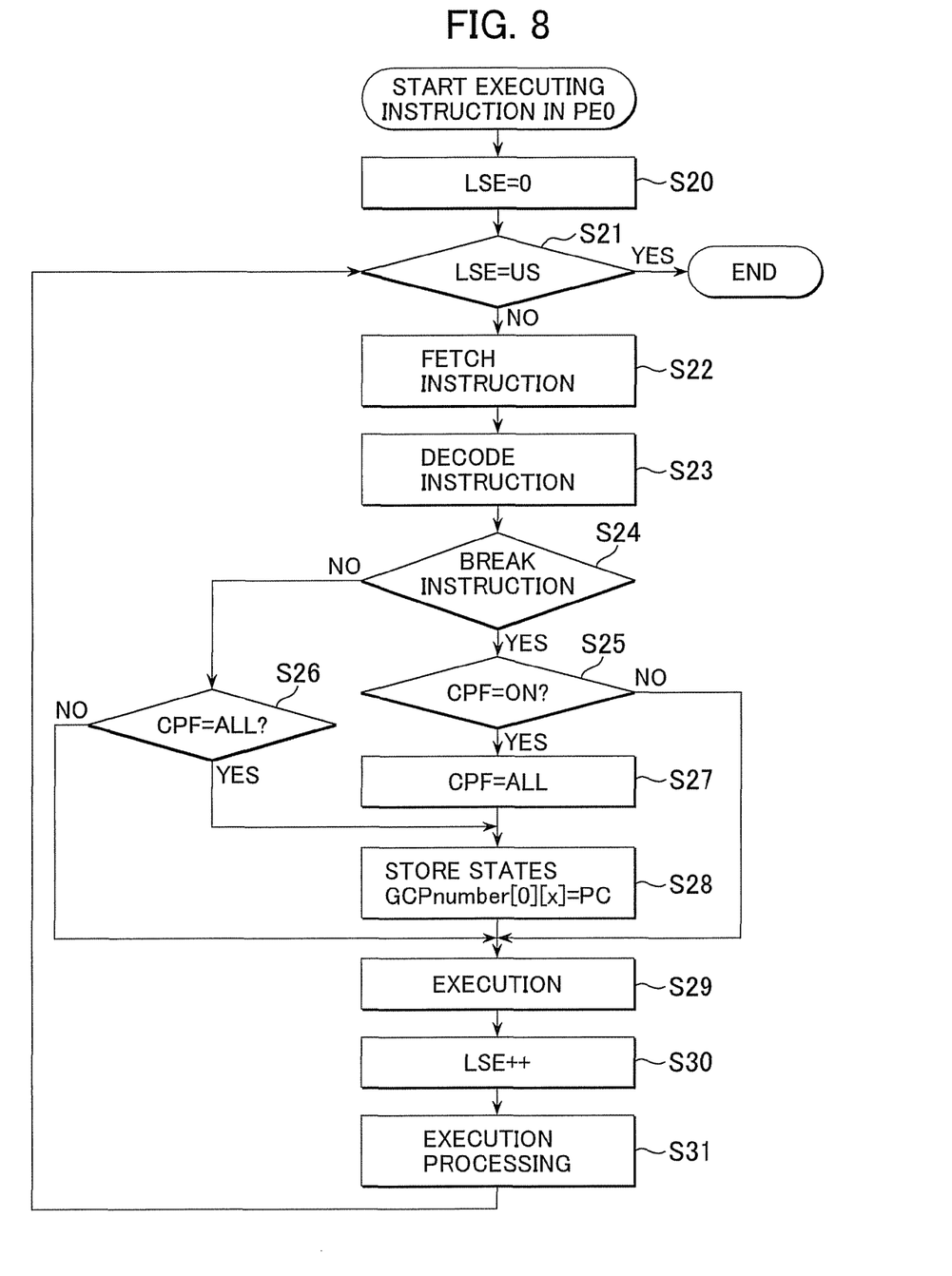
FIG. 8 is a flowchart illustrating an example processing for setting a restore point and storing a state after the setting of a break.

FIG. 8 is a flowchart illustrating example processing for setting a restore point and storing a state when a break has been set according to an embodiment.

In the instruction execution, for example by the ISS, a number of instructions to be executed (execution operations) in the exe_loop function are specified, and instructions are, for example, executed one at a time.

Note, however, that since the number of instructions in the exe_loop can depends on the architecture, the simulator may execute a plurality of instructions simultaneously rather than executing one instruction at a time. Here, in the interests of simplicity, the description is limited to a single instruction in a single loop.

The following describes the processing on executing the instruction in the core model PE0. The other core models PE1 through PEn can operate in a similar manner.

First, the simulator can set the local execution operation (LSE) to "0" (operation S20). Next the simulator can judge whether the LSE equals a number of operations (US) set by a user (operation S21). When the two are equal, the simulator can end instruction execution in the core model PE0. When the two are unequal, the simulator fetches an instruction (operation S22), and decodes the fetched instruction (operation S23).

The simulator then can judge whether a break instruction has been set (operation S24). When a break instruction has been set for the core model PE0, the simulator proceeds to the processing of operation S25. When a break instruction has not been set, the simulator proceeds to the processing of operation S26.

In the processing of operation S25, the simulator can judge the state of a flag CPF which indicates whether return points are to be set in correspondence with the break instruction, and when the state is "on", can set the flag CPF to "all". The flag CPF is a flag variable which can be referred to by the core models PE0 through PEn, and any change in operation S27 can be communicated to the other core models of the core models PE1 through PEn.

The simulator then can store the state of the core model PE0, input the program counter value PC to the serial number GCPnumber (0)(x) (operation S28), and proceed to operation S29. Here, "(0)(x)" indicates the xth restore point of the core model PE0.

When, on the other hand, a break instruction has not been set, the simulator judges in operation S26 whether the flag CPF indicates "all". The flag CPF being "all" indicates that a restore point has been set in one of the core models PE1 through PEn. Hence when judging that the CPF flag indicates "all", the simulator proceeds to the above-described operation S28 and further can store the state of model core PE0.

The setting of the flag CPF can be determined in various ways. For example, the flag may be determined in initial settings or in software by a separate program, by the user via a GUI (Graphical User Interface) for example at the break instruction, or through inclusion in the break instruction.

When judging that the flag CPF does not indicate "all" in the processing of operation S26, or judging that the flag CPF is not "on" in the processing of operation S25, the simulator proceeds to the processing of operation S29 and executes the decoded instruction. Thereafter, the simulator increments the LSE (operation S30), performs exception processing (operation S31), and repeats the processing beginning at operation S21.

Use of the above-described flag CPF makes it possible, when a restore point has been set in one of the plurality of core models PE0 through PEn, to simultaneously set restore points in the other core models of the core models PE0 through PEn and store the corresponding states.

Although the above describes a case in which the restore point is set to correspond with a break point, the user may set the restore point at a freely-selected point part-way through the operation execution of the instruction via the GUI for example. For example, when the restore points have been freely set, the simulator can make use of the above-described flag CPF to simultaneously set restore points in all of the core models PE0 through PEn, and store the corresponding states.

Alternatively, rather than using the flag CPF, a number of execution operations or a number of cycles at which the restore point is set in a given one of the core models PE0 through PEn may be communicated to the other core models of the core models PE0 through PEn. The simulator may then simultaneously set restore points in the other core models and store the corresponding states.

The freely-selected restore points may also be set to be before instruction execution in the core models PE0 through PEn.

Figure 9:
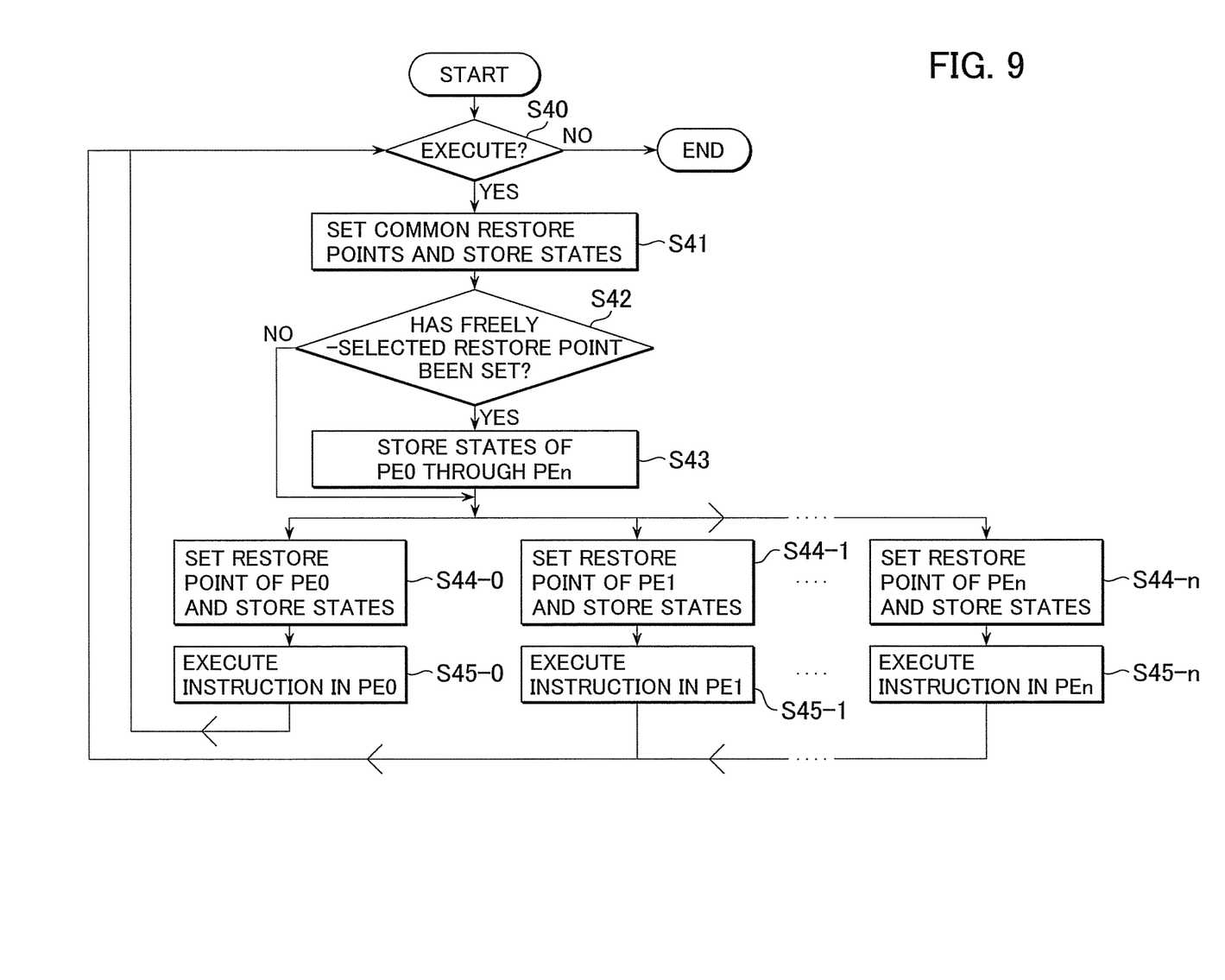
FIG. 9 is a flowchart illustrating an example processing when setting freely-selected restore points according to an embodiment.

FIG. 9 is a flowchart illustrating example processing when setting a freely-selected restore point according to an embodiment.

The processing of operations S40 and S41 is substantially the same as the processing of operations S10 and S11 of FIG. 7. After operation S41, the simulator judges whether a freely-selected restore point has been set by the user (operation S42), and when judging that a restore point has been set, saves states of the core models PE0 through PEn (operation S43), and proceeds to the processing of operations S44-0, S44-1, . . . S44-n. When a freely-selected restore point has not been set, the simulator proceeds directly to operations S44-0 through S44-n. The operations S44-0 through S44-n constitute processing for setting periodic restore points and storing the corresponding states. This processing is substantially the same as the processing of operation S12-0 through S12-n. Thereafter, the simulator performs the instruction execution processing of the core models PE0 through PEn (operations S45-0, S45-1, . . . , and S45-n), and repeats the processing beginning at operation S40.

As shown in FIG. 9, the freely-selected restore points can be combined with the periodic restore points. Though not shown in the drawings, the setting of periodic restore points or freely-selected restore points may be combined with the setting of the restore points corresponding to breaks points of the type shown in FIG. 8 which correspond to example break points.

When states of the core models PE0 through PEn are to be reproduced using the various types of restore point set in the example manner described above, the internal data of the core models PE0 through PEn and the information in the memory and in the I/O model in the simulator of the type shown in example FIG. 6 can be destroyed. Information relating to the restore point at which the state is to be reproduced can then read, and written over the information in the simulator.

The information stored at the above-described various restore points may be compressed before being stored.

Also, although the information relating to the restore points was described as being stored in the SDRAM 13 or in the cache due to access speed considerations, when the multicore CPU 11 judges that memory consumption is large the information can be stored, for example, in the HDD 14.

The simulation method of an example embodiment can include setting of the simultaneous restore points in all the core models PE0 through PEn, but the restore points may be individually set in the core models PE0 through PEn and the corresponding states stored accordingly, according to an embodiment.

Moreover, an example was described in which the core models PE0 through PEn were used to model the processor cores of the multicore processor. However, the core models PE0 through PEn may be used to model processors of a multiprocessor or master devices (CPU, DMA, etc.) of a multi-master/slave device according to an embodiment.

As an example, the following describes example processing for storing periodic restore points for a multi-master/slave device according to an embodiment.

Figure 10:
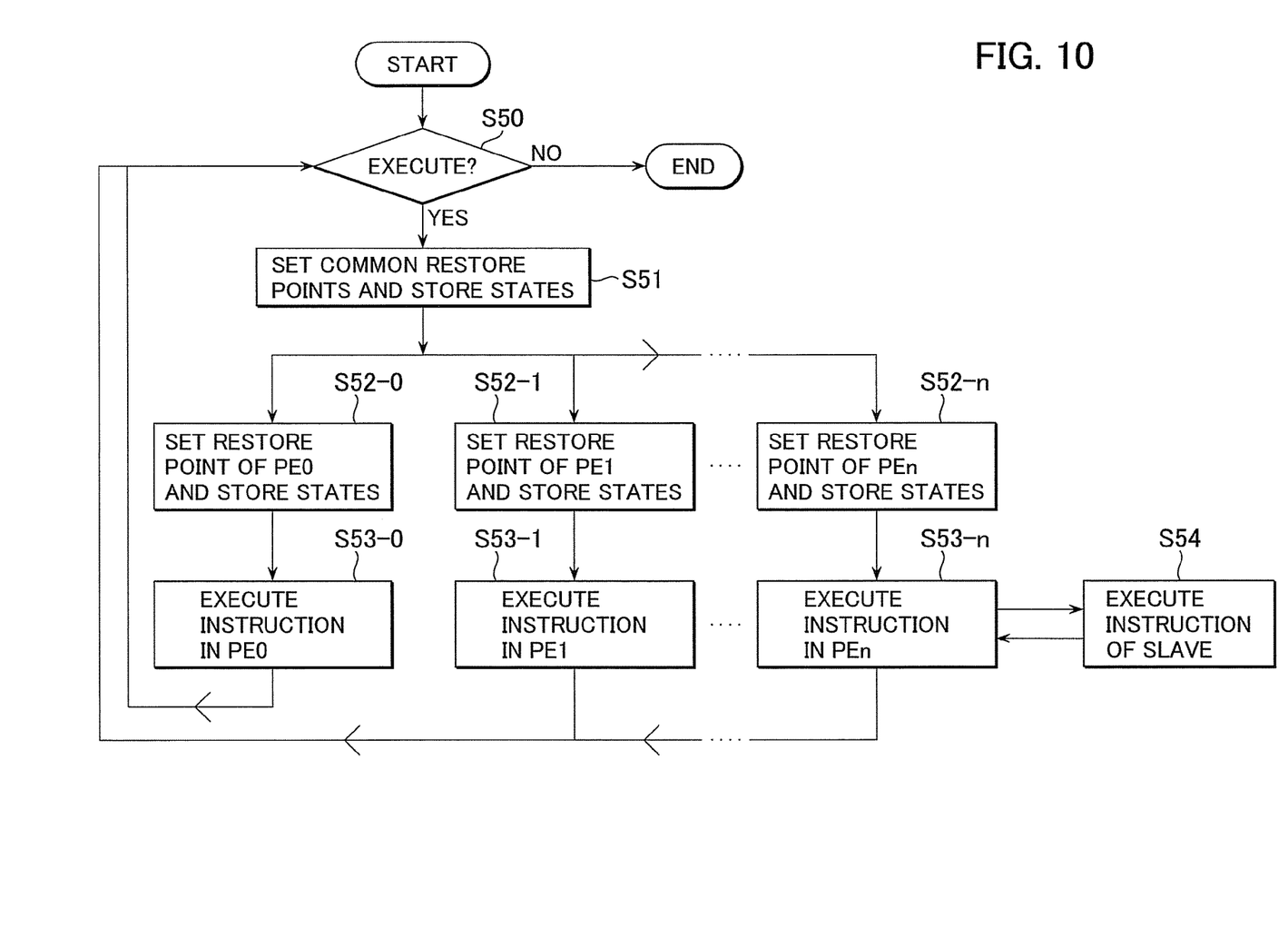
FIG. 10 is a flowchart illustrating example processing for setting periodic restore points when master devices of a multi-master/slave device are modeled using the core models according to an embodiment.

FIG. 10 is a flowchart illustrating example processing for setting restore points at regular intervals when master devices of the multi-master/slave device are modeled using the core models according to an embodiment.

When performing execution judgment (operation S50) and judging to execute, the simulator can set restore points (common restore points) in the I/O model (slave) shared by the core models PE0 through PEn which are models for simulating the master device (CPU or DMA), and can store the corresponding states in the DRAM 13 or in the cache memory (not shown in the drawings) of the multicore CPU 11 (operation S51).

The simulator can then perform processing to set periodic restore points or each of the core models PE0 through PEn, an example shown in FIG. 10, and can store the state of the core model PE0 (operation S52-0, S52-1, . . . , S52-2).

The simulator can then perform the instruction execution in the core models PE0 through PEn (operation S53-0, S53-1, . . . , S53-n). At this point, when there is an I/O model that is the slave of the core model PEn, the core model PEn can call the slave and causes the slave to execute processing. After completion of the instruction execution, the processing goes back (returns) to the master which operates the slave (operation S54).

The setting of restore points corresponding to the break instruction and the setting of restore points freely-selected by the user in core models corresponding to the multi-master/slave can be performed in the same manner as in the case of the multiprocessor.

Since an example embodiment makes it possible to simultaneously set restore points across a plurality of core models and store corresponding states of each core model, deadlocks, IO races, and overlapping access to common variables, which are important in debugging when developing multicore processor-use (or a multiprocessor or multi-master/slave device-use) software for performing parallel processing, can be easily determined using the simulation.

Although a few embodiments have been shown and disclosed, it would be appreciated by those skilled in the art that changes may be made in these embodiments without departing from the principles and spirit of the invention, the scope of which is defined in the claims and their equivalents.

What is claimed is:

1. A simulation method comprising:
setting restore points in each of a plurality of core models for executing threads using parallel processing, the restore points being set according to an interval defined by a restore point value which corresponds to a predetermined number of execution operations or simulator cycles, wherein the restore points for each of the plurality of core models, are set simultaneously; and
storing, in a storage unit, when a program counter value is the same as the restore point value information for reproducing a state of each of the plurality of core models at the restore points, wherein after storing the information at a new one of the restore points, the storage unit overwrites previously stored information with information corresponding to the new restore point,
wherein, when a fetched instruction is a break instruction, the restore point is set in one of the plurality of core models and a flag that is referable by the plurality of core models is set, wherein, when the fetched instruction is not the break instruction and the flag has been set, the restore point is set in the one of the plurality of core models, wherein, when the fetched instruction is not the break instruction and the flag has not been set, the restore point is not set in the one of the plurality of core models.

2. The simulation method of claim 1, wherein the restore points are set periodically and, in each period, simultaneously in the plurality of core models.

3. The simulation method of claim 1, wherein after storing the information at a predetermined number of the restore points, the storage unit sequentially overwrites previously stored information with information corresponding to the new restore points.

4. The simulation method of claim 1, wherein when one of the restore points has been set part-way through execution of an instruction in any one of the plurality of core models, corresponding restore points are set in other core models of the plurality of core models.

5. The simulation method of claim 1, wherein the flag is initialized by at least one of an initial setting, a software, a graphical user interface and a break instruction.

6. The simulation method of claim 4, wherein the restore points are set at time points freely-selected by a user.

7. The simulation method of claim 1, wherein the restore points are set simultaneously in the plurality of core models at a time point freely-selected by a user.

8. The simulation method of claim 1, wherein the information is compressed before being stored in the storage unit.

9. The simulation method of claim 1, wherein the plurality of core models are simulation models for processors in a multiprocessor, for processor cores in a multicore processor, or master devices in a multi-master/slave device.

10. The simulation method of claim 1, wherein each piece of the stored information is managed by being corresponded with a core number of a core model and a program counter value for a timing at which the restore point was set.

11. A simulation device comprising:
a restore point setting configured to set restore points in each of a plurality of core models for executing threads using parallel processing, the restore points being set according to an interval defined by a restore point value which corresponds to a predetermined number of execution operations or simulator cycles, wherein the restore points for each of the plurality of core models are set simultaneously; and
a storage unit configured to store, when a program counter value is the same as the restore point value, information to reproduce a state of each of the plurality of core models at the restore points, wherein after storing the information at one of the restore points, the storage unit overwrites previously stored information with information corresponding to the new restore point,
wherein, when a fetched instruction is a break instruction, the restore point is set in one of the plurality of core models and a flag that is referable by the plurality of core models is set,
wherein, when the fetched instruction is not the break instruction and the flag has been set, the restore point is set in the one of the plurality of core models,
wherein, when the fetched instruction is not the break instruction and the flag has not been set, the restore point is not set in the one of the plurality of core models.

12. The simulation method of claim 1, further comprising:
judging whether a program counter value is the same as a periodic restore point value, and when the two values are judged to be the same, the information for reproducing a state of each of the plurality of core models is stored.

13. The simulation device of claim 11, wherein the flag is initialized by at least one of an initial setting, a software, a graphical user interface and the break instruction.

* * * * *